US008270801B2

(12) United States Patent
Ge

(10) Patent No.: US 8,270,801 B2
(45) Date of Patent: Sep. 18, 2012

(54) VIDEO DEVICE AND METHOD FOR CAPTURING VIDEO WITH PERSONAL INFORMATION

(75) Inventor: Chi-Sheng Ge, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 288 days.

(21) Appl. No.: 12/843,067

(22) Filed: Jul. 26, 2010

(65) Prior Publication Data

US 2011/0268423 A1      Nov. 3, 2011

(30) Foreign Application Priority Data

Apr. 29, 2010   (CN) .......................... 2010 1 0160101

(51) Int. Cl.
*H04N 5/77* (2006.01)
(52) U.S. Cl. ....................................... 386/224; 386/227
(58) Field of Classification Search ................... None
See application file for complete search history.

(56) References Cited

U.S. PATENT DOCUMENTS

| | | | | |
|---|---|---|---|---|
| 2009/0066513 A1* | 3/2009 | Kondo et al. | ............... | 340/572.1 |
| 2010/0182436 A1* | 7/2010 | Boman et al. | ............... | 348/207.1 |

* cited by examiner

*Primary Examiner* — William C Vaughn, Jr.
*Assistant Examiner* — Asher Khan
(74) *Attorney, Agent, or Firm* — Altis Law Group, Inc.

(57) ABSTRACT

A method for capturing videos applied in a video device is provided. The video device includes a video capturing unit having a field of view and a timer. The video device includes a position sensing unit capable of sensing first position information, and an orientation sensing unit. The video device rotatingly receives second position information and personal information periodically. The method included is first to clear the timer and begin the timer again. Then, obtaining the second position information, the personal information, the first position information, and the orientation. Next, forming a coordinate system and converting the first position information and the second position information to a set of coordinates. Then, determining which person correspond to which of the portable communication devices, and associating the personal information with each person. Next, generating a composite image and a composite video comprising the composite images.

14 Claims, 5 Drawing Sheets

VIDEO DEVICE AND METHOD FOR CAPTURING VIDEO WITH PERSONAL INFORMATION

BACKGROUND

1. Technical Field

The present disclosure relates to video devices and methods for capturing videos.

2. Description of Related Art

In order to make each person recognizable in an image by people who do not know him/her or who have forgotten his/her name, the conventional way is to manually add personal information, for example names, to videos, which is time consuming and inconvenient.

BRIEF DESCRIPTION OF THE DRAWINGS

The components of the drawings are not necessarily drawn to scale, the emphasis instead being placed upon clearly illustrating the principles of a video device and of a method for capturing videos. Moreover, in the drawings, like reference numerals designate corresponding parts throughout several views.

DETAILED DESCRIPTION

Figure 1:
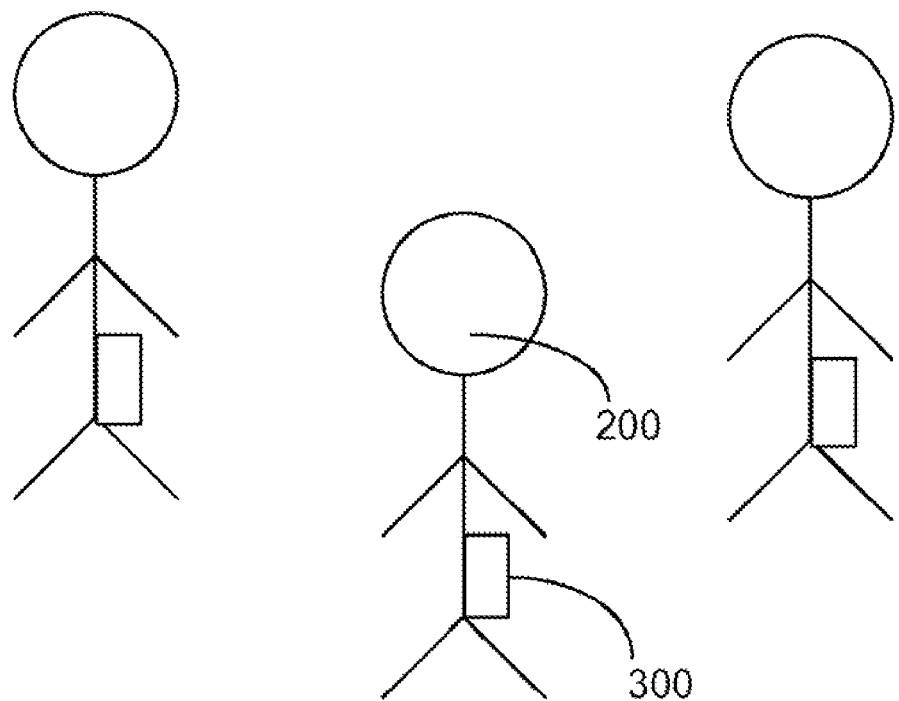
FIG. 1 is a schematic view of a video device in accordance with an exemplary embodiment.
Figure 1:
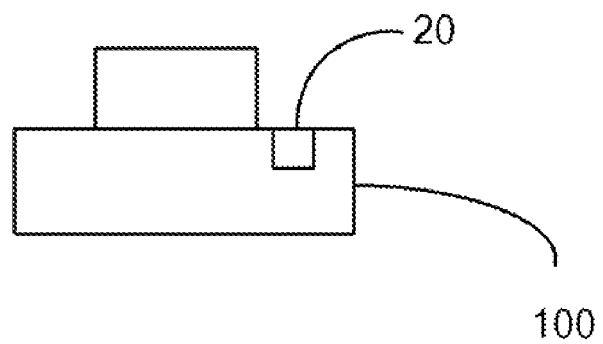
Figure 2:
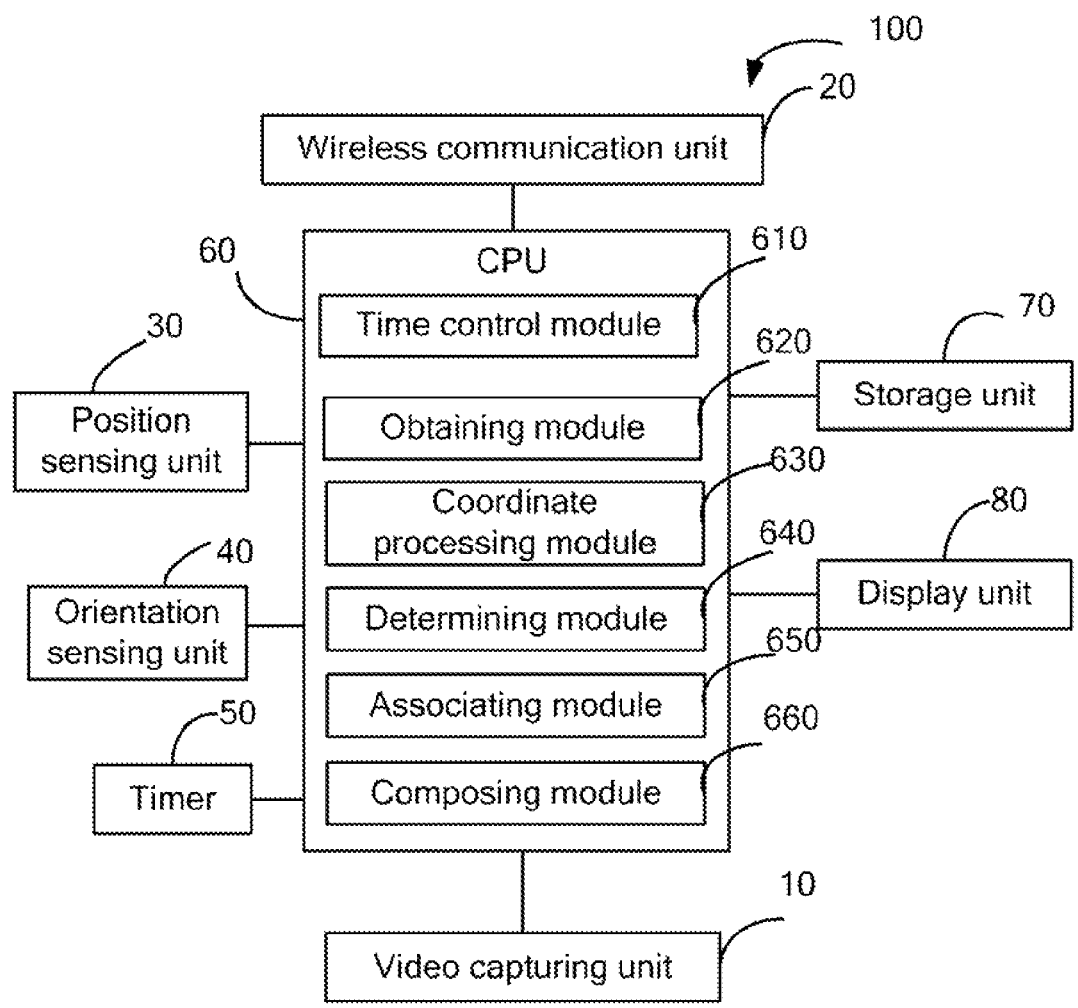
FIG. 2 is a block diagram of the video device of FIG. 1.

Referring to FIGS. 1-2, a video device 100 in accordance with an exemplary embodiment is shown. The video device 100 includes a video capturing unit 10 used to capture videos. In the embodiment, the video device 100 captures a video of persons 200 each of whom wears a portable communication device 300 by turns or rotatingly communicating with the video device 100 in a predetermined time. The video includes images. The video device 100 can sense first position information of the video device 100 and determine which orientation the video capturing unit 10 should face. Each portable communication device 300 can sense second position information of the portable communication device 300 and rotatingly transmit the second position information and personal information edited according to a request from the device 100 to the device 100. The video device 100 can determine whether one portable communication device 300 is in field of view of the video capturing unit 10 according to the first position information, the determined orientation, and the second position information of each portable communication device 300. If a particular portable communication device 300 is in field of view, the video device 100 further determines which person 200 of a captured image corresponds to the portable communication device 300, according to the second position information. When the video device 100 determines which person 200 corresponds to the portable communication device 300, it associates the personal information from the portable communication device 300 with the determined person 200. The video device 100 then generates a composite image according to the relationship between each determined person 200 and the associated personal information. The composite images form a composite video.

Figure 3:
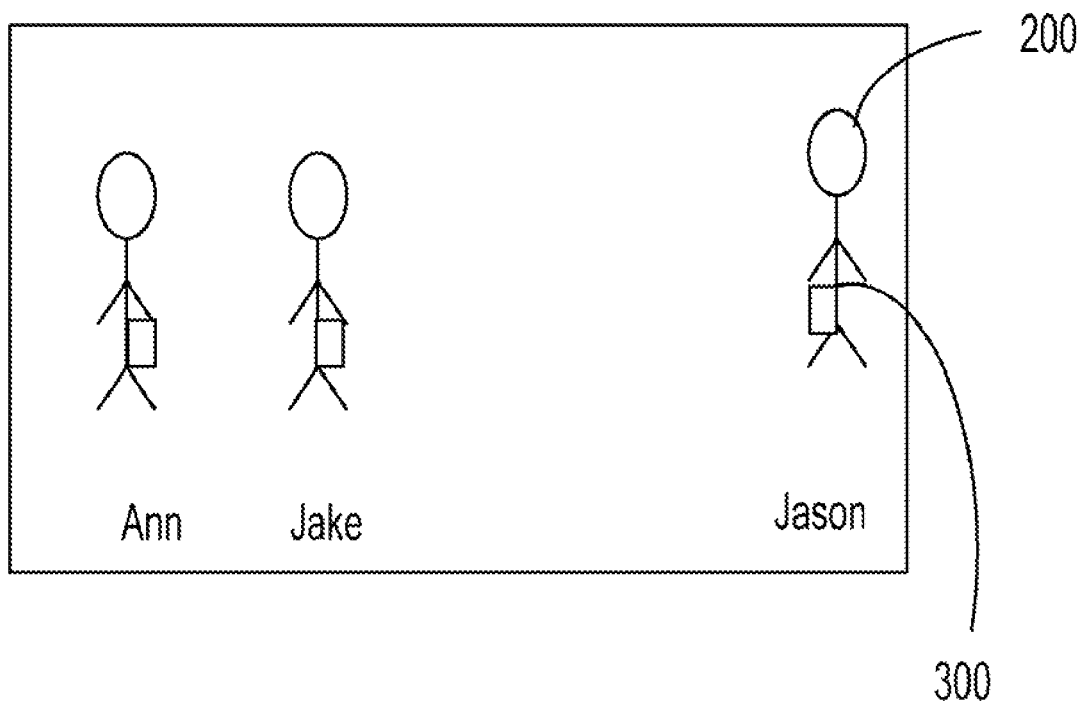
FIG. 3 is a schematic view showing a video with personal information.

In the embodiment, the composite video includes the personal information within the field of view. Therefore, each person in the composite video can be recognized according to their personal information. As shown in FIG. 3, in the embodiment, the personal information from each portable communication device 300 within field of view is a name, for example, Ann, Jake, or Jason, of the person 200 wearing the portable communication device 300.

The video device 100 further includes a wireless communication unit 20, a position sensing unit 30, an orientation sensing unit 40, a timer 50, a central processing unit (CPU) 60, a storage unit 70, and a display unit 80.

The video device 100 communicates with the devices 300 through the wireless communication unit 20.

The position sensing unit 30 is configured to sense the first position information of the video device 100. In the embodiment, the position sensing unit 30 is a Global Position System (GPS). The first position information is the longitude and latitude of the video device 100. The orientation sensing unit 40 is configured to sense which orientation the video capturing unit 10 faces. In the embodiment, the orientation sensing unit 40 includes and uses a compass.

The timer 50 can have a default setting or a user-selected setting. In the embodiment, the timer 50 may count up or count down.

The CPU 60 includes a time control module 610, an obtaining module 620, a coordinate processing module 630, a determining module 640, an associating module 650, and a composing module 660.

The time control module 610 is configured to begin the timer 50 when the video capturing unit 10 begins to capture a video, and clear the timer 50 and begin the timer 50 again when the time of the timer 50 reaches a predetermined time.

The obtaining module 620 is configured to obtain the second position information of the portable communication device 300 and the personal information through the wireless communication unit 20, the first position information from the position sensing unit 30, and the orientation from the orientation sensing unit 40 when the time of the timer 50 reaches the predetermined time.

The coordinate processing module 630 is configured to form a coordinate system according to the first position information and the orientation, and convert the first position information and the second position information of each portable communication device 300 into a set of coordinates according to the coordinate system. In the embodiment, the coordinate system is the Descartes coordinate system. The coordinate origin is the intersection of the position sensing unit 30 and the orientation, that is, the first position information is converted to the coordinate (X=0, Y=0).

The determining module 640 is configured to determine whether a particular portable communication device 300 is in the field of view of the video device 100 according to the Descartes coordinate system and the coordinates of the portable communication device 300.

If a portable communication device 300 is in the field of view of the video device 100, the associating module 650 determines which person of a captured image corresponds to the portable communication device 300 according to its second position information, and associates the personal information from the portable communication device 300 with the determined person 200.

The composing module 660 is configured to generate a composite image according to the relationship between each determined person 200 and the personal information associated with the determined person 200 and generates a composite video including the composite images after the video device stops capturing the video. The composite video is then stored in the storage unit 70.

The display unit 80 is configured to display the composite video.

Figure 4:
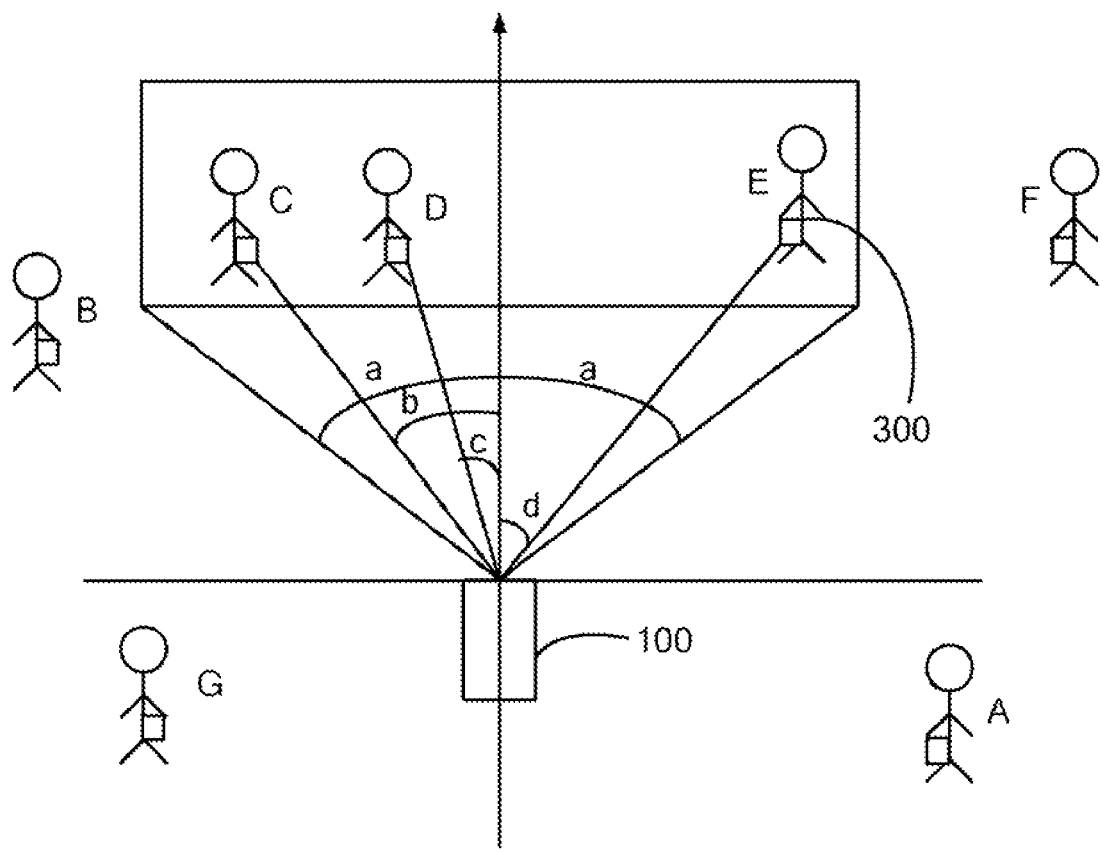
FIG. 4 is a schematic view employed to illustrate how to determine whether one portable communication device is within the field of view of the video device of FIG. 1. Field of view hereinafter refers to the video field the video device is capable of capturing videos.

FIG. 4 is a schematic view illustrating how to determine whether a portable communication device 300 is in the field of view of the video device 100 in each image. In FIG. 4, there are people illustrated by A, B, C, D, E, F, and G. After capturing the video of the field of view area "2a", the video device 100 cyclically sends a request to the portable communication devices 300 worn by the people A, B, C, D, E, F, and G at the predetermined time. Each portable communication device 300 then cyclically transmits the second position information and edits personal information corresponding to the request to the video device 100 in the predetermined time. The video device 100 determines the Descartes coordinate system and converts the first position information and the second position information of each video device 100 into a set of coordinates. The video device 100 then determines the angle between each portable communication device 300 and the video capturing unit 10 according to the Descartes coordinate system and then converts a set of coordinates. If the angle of a particular portable communication device 300 and position sensing unit 30 is less than "a", the video device 100 determines the portable communication device 300 namely the person wearing the portable communication device 300 is in the field of view. In the embodiment, the angle "b", "c" and "d" are less than "a", that is, the people C, D, and E are within the field of view.

Figure 5:
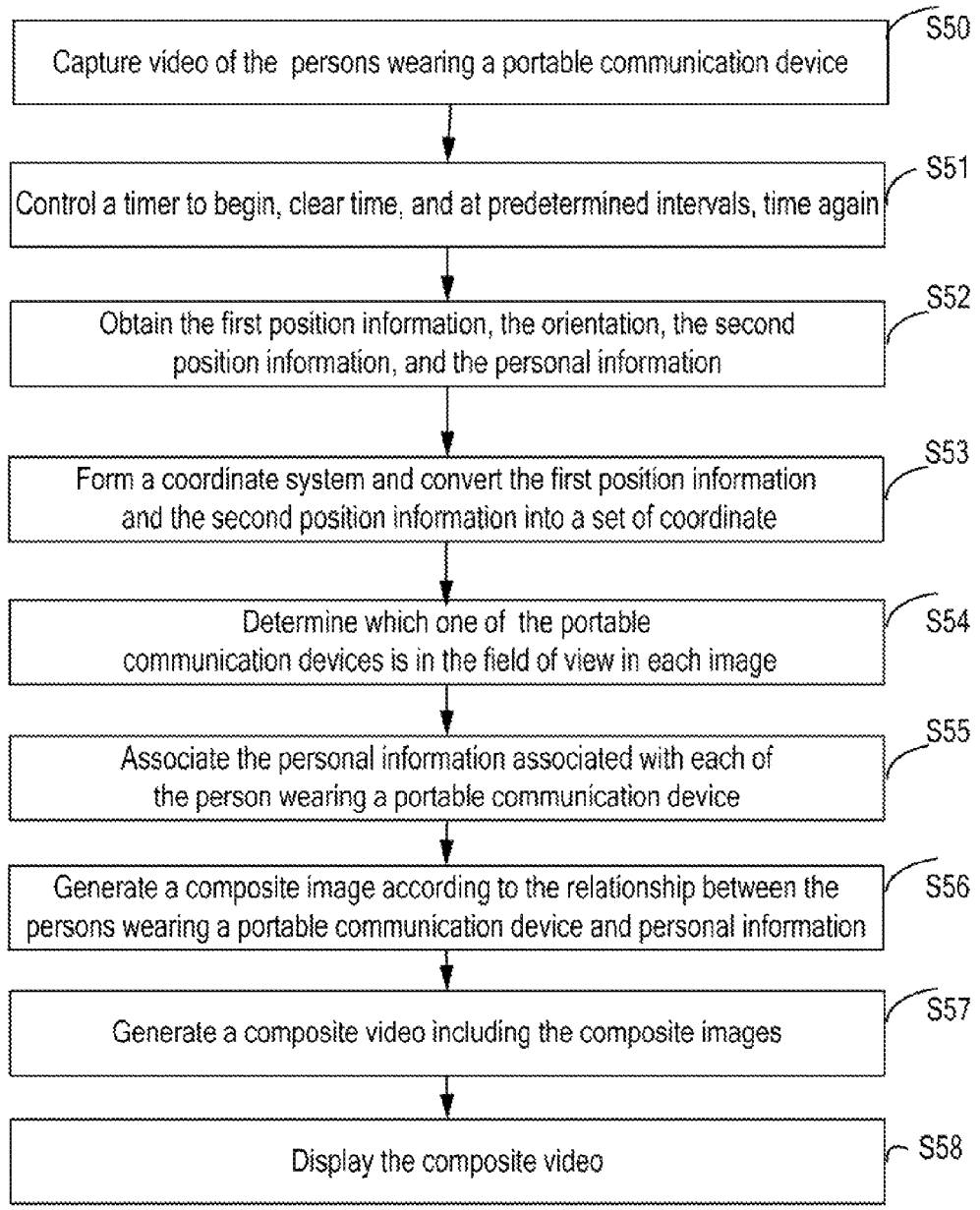
FIG. 5 is a flowchart of a method for capturing a video in accordance with an exemplary embodiment.

FIG. 5 is a flowchart of a method for capturing a video in accordance with an exemplary embodiment.

In step S50, the video device begins to capture a video of the persons 200 each wearing a portable communication device 300.

In step S51, the time controlling module begins the timer, clears the timer, and begins the timer again after reaching a predetermined time.

In step S52, the obtaining module 620 obtains the first position information, the orientation, the second position information of each portable communication device 300 and the personal information edited corresponding to the request from the video device 100 when the time of the timer 50 reaches the predetermined time.

In step S53, the coordinate processing module 630 forms a coordinate system according to the first position information and the orientation, and converts the first position information and the second position information of each portable communication device 300 to the set of coordinates according to the coordinate system.

In step S54, the determining module 640 determines which of the portable communication devices 300 are in the field of view of the video capturing unit 10 according to the coordinate system and the set of coordinates of the portable communication device 300.

In step S55, the associating module 650 determines which person 200 of a captured image corresponds to which portable communication device 300 according to the set of coordinates of the portable communication device 300, and associates the personal information with the determined person 200.

In step S56, the composing module 660 generates a composite image according to relationship between each determined person 200 and the personal information associated with the determined person 200.

In step S57, after the video device 100 stops capturing the video, the composing module 660 generates a composite video including the composite images.

In step S58, the display unit 80 displays the composite video.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A video device, comprising:
   a video capturing unit having a field of view, the video capturing unit to capture a video, the video comprising a plurality of images;
   a position sensing unit to sense a first position information of the video device;
   an orientation sensing unit to sense which orientation the video capturing unit faces;
   a timer;
   a wireless communication unit rotatingly communicating with a plurality of portable communication devices some of which are in the field of view, and to receive second position information of each of the portable communication devices and personal information from each of the communication portable devices; and
   a central processing unit (CPU) to:
     begin the timer when the video capturing unit starts to capture the video and clear the timer and begin the timer again when the time of the timer reaches a predetermined time;
     obtain the second position of the portable communication device and the personal information through the wireless communication unit, the first position information from the position sensing unit, and the orientation from the orientation sensing unit when the time of the timer reaches the predetermined time;
     form a coordinate system and convert the first position information and the second position information into a set of coordinates according to the coordinate system, the origin of the coordinate system being the intersection of the determined orientation and the position sensing unit;
     determine whether one of the portable communication devices is in the field of view according to the coordinate system and the set of coordinates of the one of the portable communication devices;
     determine which person of one captured image corresponds to one of the portable communication devices according to the second position information of the one of the wireless communication units if the one of the portable communication devices is in the field of view, and associate the personal information from one of the portable communication devices with the determined person of the captured image; and
     generate a composite image according to the relationship between each determined person of the captured image and the personal information associated with each determined person of the captured image and generate a composite video including the composite images.

2. The video device as described in claim 1, wherein the CPU is further to determine that one of the portable communication devices is in the field of view when the angle between the video device and the one of the portable communication devices is less than half of the field of view according to the coordinate system and the set of coordinates of the portable communication devices.

3. The video device as described in claim 1, wherein the coordinate system is a Descartes coordinate system.

4. The video device as described in claim 1, further comprising a storage unit configured to store videos.

5. The video device as described in claim 1, further comprising a display unit configured to display videos.

6. The video device as described in claim 1, wherein the orientation sensing unit comprises a compass.

7. The video device as described in claim 1, wherein the position sensing unit is a GPS.

8. A video device, comprising
a video capturing unit having a field of view to capture video, the video comprising a plurality of images;
a position sensing unit to sense a first position information of the video capturing unit;
an orientation sensing unit to sense which orientation of the video capturing unit faces;
a timer;
a wireless communication unit rotatingly communicating with portable communication devices, and to obtain second position information and personal information; and
a central processing unit (CPU), comprising
a time control module to begin the timer when the video capturing unit starts to capture video, and clear the timer and begin the timer again when the time of the timer reaches a predetermined time;
an obtaining module to obtain the second position information of the portable communication device and the personal information through the wireless communication unit, the first position information of the video device from the position sensing unit, and the orientation information from the orientation sensing unit when the time of the timer reaches the predetermined time according to the signal from the time control module;
a coordinate processing module to form a coordinate system and convert the first position information and the second position information to a set of coordinates according to the coordinate system, the origin of the coordinate system being the intersection of the determined orientation and the position sensing unit;
a determining module to determine whether one portable communication device is in the field of view of the video capturing unit according to the coordinate system and the set of coordinates of the one of the portable communication devices;
an associating module to determine which person of the captured image corresponds to the portable communication devices, and then associate the personal information from the one of the portable communication devices with the determined person of the captured image; and
a composing module to generate a composite image according to the relationship between each determined person of the captured image and the personal information associated with each determined person of the captured image, then generate a composite video including the composite images.

9. The video device as described in claim 8, further comprising a storage unit configured to store the composite videos.

10. The video device as described in claim 8, further comprising a display unit configured to display videos.

11. The video device as described in claim 8, wherein the determining module is to determine one of the portable communication devices is in the field of view in each image when the angle between the video device and the one of the portable wireless devices is less than half of the field of view according to the coordinate system and the set of coordinates of the one of the portable communication devices.

12. A method for capturing videos applied in a video device, the video device comprising a video capturing unit having a field of view, the video device comprising a position sensing unit capable of sensing first position information, an orientation sensing unit capable of determining which orientation the video capturing unit faces, and a timer, the video device rotatingly communicating with a plurality of portable communication devices some of which are in the field of view and receiving second position information and personal information of each of the portable communication devices periodically, the method comprising:
beginning the timer when the video device begins to capture a video and clearing the timer and beginning the timer again when the time of the timer reaches a predetermined time;
obtaining the second position information of the portable communication device and the personal information, the first position information from the position sensing unit, and the orientation from the orientation sensing unit when the time of the timer reaches the predetermined time;
forming a coordinate system and converting the first position information and the second position information to a set of coordinates according to the coordinate system, the origin of the coordinate system being the intersection of the determined orientation and the position sensing unit;
determining whether one of the portable communication devices is in the field of view according to the coordinate system and the set of coordinates of the one of the wireless communication units;
determining which person of one captured image corresponds to one of the portable communication devices, and associating the personal information from the one of the portable communication devices with the determined person of the captured image;
generating a composite image according to the relationship between each determined person of the captured image and the personal information associated with each determined person of the captured image; and
generating a composite video comprising the composite images after the video device stops capturing the video.

13. The method of capturing videos as described in claim 12, wherein the step of determining whether one of the portable communication device is in the field of view in each image according to the coordinate system and the set of coordinates of the one of the portable communication devices comprises:
determining that one portable communication device is in the field of view when the angle between the video device and the one of the portable communication devices is less than half of the field of view according to the coordinate system and the set of coordinates of the one of the portable communication devices.

14. The method of capturing videos as described in claim 12 further comprising displaying the composite video.

* * * * *